United States Patent [19]

Hanke et al.

[11] 4,274,952
[45] Jun. 23, 1981

[54] APPARATUS FOR SEPARATING SOLIDS FROM A SUSPENSION

[75] Inventors: Reinhard Hanke, Leoben; Kornel Jahn, Vienna, both of Austria

[73] Assignee: Voest-Alpine Aktiengesellschaft, Linz, Austria

[21] Appl. No.: 89,240

[22] Filed: Oct. 29, 1979

[30] Foreign Application Priority Data

Oct. 7, 1978 [AT] Austria .................................. 7941/78

[51] Int. Cl.³ ............................................ B07B 1/06
[52] U.S. Cl. .................................. 209/273; 209/353; 209/274; 210/409
[58] Field of Search .............. 209/274, 281, 392, 393, 209/394, 396, 311, 352–354, 403, 409, 356, 264, 273; 210/409, 456

[56] References Cited

U.S. PATENT DOCUMENTS

| | | | |
|---|---|---|---|
| 566,260 | 8/1961 | Wightman | 209/394 X |
| 982,207 | 11/1911 | Nall | 209/354 X |
| 1,260,409 | 3/1918 | Lieberman | 209/393 |
| 1,401,851 | 12/1921 | Avery | 209/393 X |
| 2,609,930 | 9/1952 | Soldan | 209/403 X |
| 2,984,356 | 5/1961 | Bruninghaus | 209/356 X |
| 3,261,470 | 7/1966 | Daniels | 209/260 UX |
| 3,347,375 | 10/1967 | Nofer | 209/395 |
| 3,815,740 | 6/1974 | Ginaven | 209/264 |
| 3,835,999 | 9/1974 | Moore | 209/260 X |

FOREIGN PATENT DOCUMENTS

23816 9/1897 United Kingdom ..................... 209/396

Primary Examiner—Robert Halper
Attorney, Agent, or Firm—Kurt Kelman

[57] ABSTRACT

A sieve chain having upper and lower ends is disposed in a housing and comprises a plurality of sieve sections and hinge means connecting adjacent ones of said sieve sections in series from one of said ends to the other. Each of said sieve sections has an inclination in the general direction from said upper to said lower end. A hinge connects one of said ends of said chain to said housing. An adjusting device is hingedly connected to the other end of said chain. The suspension flows over said sieve chain in the general direction from said upper to said lower end.

3 Claims, 1 Drawing Figure

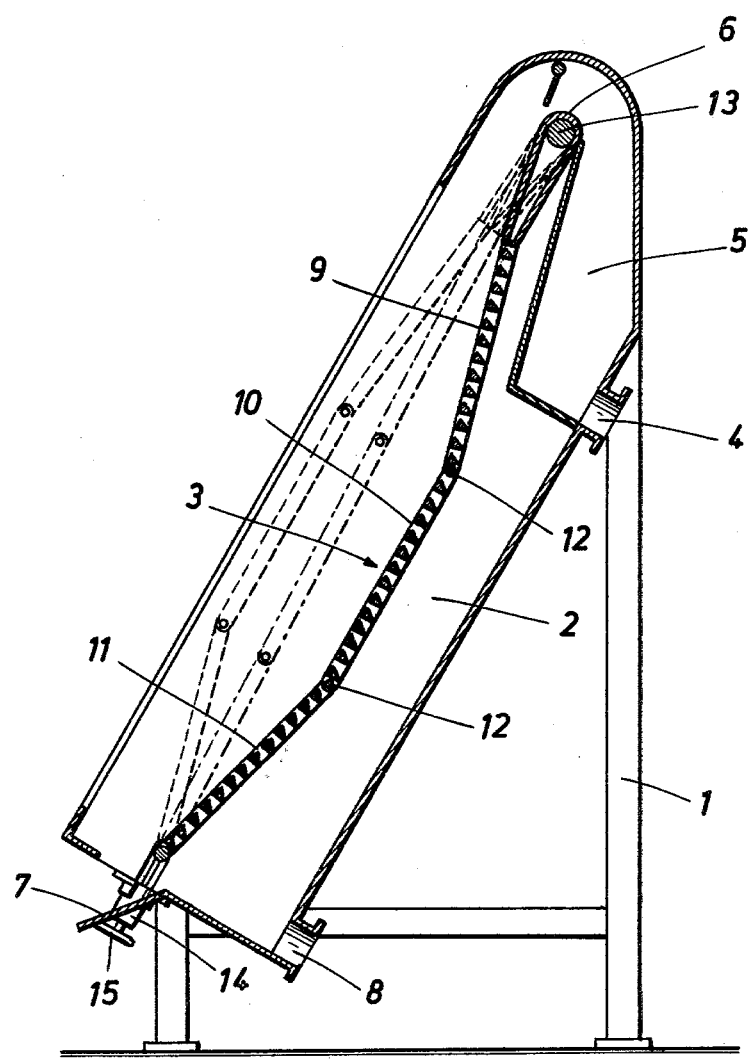

APPARATUS FOR SEPARATING SOLIDS FROM A SUSPENSION

This invention relates to apparatus for separating solids from a suspension, comprising a sieve, which is mounted in a housing and is adapted to be flown over by the suspension and consists of at least two sieve sections, which are arranged one behind the other in the direction of flow and each of which comprises sieve bars which extend transversely to the direction of flow and define sieve gaps between them.

Because the size, shape and weight of solid particles contained in different suspensions may differ greatly, the design of the sieve should be adaptable to the solids to be separated. For this purpose it is often necessary to conduct experiments in which the gap width and the angle of inclination of the sieves are determined. The angles of inclination which have thus been ascertained must often be corrected because the suspensions differ. A change of the angles of inclination of several sieve sections is a relatively time-consuming operation because the several sieve sections should not be adjusted independently of each other. For this reason it is not possible to adapt known apparatus for separating solids from a suspension to changing conditions and unsatisfactory results of the separation must be expected in such cases.

It is an object of the invention to avoid these disadvantages and so to improve apparatus of the kind described first hereinbefore that matched adjustments of the angles of inclination of several sieve sections can be effected quickly and with simple means.

This object is accomplished according to the invention in that adjacent sieve sections are connected to each other by hinges to form a chain, which is hinged at one end to the housing and to the other end to an adjusting device, preferably to a tensioning device. Because the several sieve sections are connected to each other by hinges to form a chain and because this chain is hinged to the housing, the inclination of the several sieve sections can be adjusted in that the chain end which is not hinged to the housing is displaced. As the chain sags freely in accordance with a catenary, the desired interdependence of the angles of inclination of the several sieve sections will be automatically obtained. Fibrous solids tend to deposit on the lowermost sieve section and to form a non-woven fabric, which can no longer be automatically removed. For a separation of such solids, the catenary is desirably inverted so that it is upwardly convex in that the angles of inclination of the sieve sections increase in the direction of flow. This can be effected in a simple manner if the hinges of the chain are subjected to a suitable spring bias by which the adjustment of the several sieve sections to the correct inclinations is ensured. Alternatively, the hinges of the chain may be locked in a simple manner.

Various designs may be adopted for the adjusting device, which serves merely to define different positions of the ends of the chain constituted by the sieve sections. A particularly simple adjustment will be enabled if the adjusting device consists of a tensioning device because in that case the sag, or the upward arching of the chain due to the spring bias, and, as a result, the different angles of inclination of the sieve sections can be adjusted by a change of the chain tension.

An embodiment of the invention is shown diagrammatically and by way of example on the drawing, which is a simplified longitudinal sectional view showing apparatus according to the invention for separating solids from a suspension.

As is apparent from the drawing, the apparatus for separating solids from a suspension comprises a housing 2, which is carried by a frame 1 and contains a sieve 3. The suspension to be processed is fed to the apparatus through an inlet 4 and flows through a stilling chamber 5 and across an overflow edge 6 to the sieve 3, on which the suspension is separated into its solid and liquid fractions. The solid fraction can be discharged via a chute 7. The liquid is drained through an outlet pipe 8.

The sieve 3 consists of three sections 9, 10 and 11, which are interconnected by hinges 12. The resulting chain is hinged at its upper end to the housing 2 and for this purpose the sieve section 9 is pivoted on a pin 13, which extends from one side wall of the housing to the other. The other end of the chain is hinged to a tensioning device 14, which in the embodiment shown by way of example consists of a power screw, which is operable by a hand wheel 15. Depending on the position of that power screw, the chain consisting of the several sieve sections 9, 10, 11 is tensioned to a higher or lower degree so that the sag of the chain will be changed with its tension. In accordance on that sag, the several sieve sections 9, 10, and 11 will automatically assume certain angles of inclination, which are matched to each other in the desired manner for each selected tension. It is apparent that it is sufficient to operate the tensioning device 14 in order to adjust the inclinations of the several sieve sections 9, 10, 11 between a position in which the chain is straight, as is indicated by dash-dot lines, and a position in which the chain has a maximum sag. In this way the apparatus can be adjusted in a simple manner to greatly varying conditions.

The general inclination of the sieve may also be influenced by a pivotal movement of the housing 2 if the latter is pivoted to the frame 1, e.g., on the pin 13.

When the apparatus is to be used with fibrous solids, the inclinations of the sieve sections should increase in the direction of flow, as is indicated in the drawing by a dotted line. In that case an automatic adjustment of the inclinations of the several sieve sections can be ensured in a simple manner in that the hinges between the seive sections are subjected to a spring bias which opposes gravity. Alternatively, the hinges may be locked in a simple manner.

What is claimed is:
1. Apparatus for separating solids from a suspension, comprising
   (a) a housing,
   (b) a sieve chain disposed in said housing and having an upper end and a lower end, the suspension containing the solids flowing over said seive chain in a general direction from said upper end to said lower end and the sieve chain being comprised of
      (1) a plurality of sieve sections and
      (2) hinge means connecting adjacent ones of said seive sections in series from one end to the other end, each sieve section having an inclination in the general direction extending from said upper end to said lower end and consisting of a plurality of sieve bars extending transversely to said general direction and said hinge means, the sieve bars defining sieve gaps therebetween,
   (c) a hinge connecting one of said sieve chain ends to said housing, and

(d) an adjusting device hingedly connecting the other one of said sieve chain ends to said housing.

2. Apparatus as set forth in claim 1, in which said adjusting device consists of a tensioning device for changing the tension of said chain.

3. Apparatus as set forth in claim 1, further comprising a support, said hinge mounting said housing on said support for pivotal movement.

* * * * *